United States Patent [19]

Presson

[11] 4,305,563
[45] Dec. 15, 1981

[54] COMPUTER TERMINAL SUPPORT

[76] Inventor: Bob E. Presson, 47 Loydell Cove, Jackson, Tenn. 38301

[21] Appl. No.: 128,136

[22] Filed: Mar. 7, 1980

[51] Int. Cl.³ ............................. A47F 5/02; A47F 7/04
[52] U.S. Cl. ..................................... 248/349; 108/140; 248/639
[58] Field of Search ................ 248/349, 639; 108/139, 108/140

[56] References Cited

U.S. PATENT DOCUMENTS

| | | | |
|---|---|---|---|
| 1,798,634 | 3/1931 | Schafer | 108/139 X |
| 2,452,291 | 10/1948 | Catron | 248/349 X |
| 2,808,223 | 10/1957 | Abeles et al. | 248/349 |
| 2,950,893 | 8/1960 | McLarney et al. | 248/349 |
| 3,224,391 | 12/1965 | Cooper | 108/140 |
| 3,479,632 | 11/1969 | Galles | 248/349 X |

FOREIGN PATENT DOCUMENTS 2518342 11/1975 Fed. Rep. of Germany ...... 248/349

*Primary Examiner*—Louis Rimrodt
*Attorney, Agent, or Firm*—Walker & McKenzie

[57] ABSTRACT

A turntable support for supporting the keyboard and visual readout of a computer terminal on a work station having several work positions. The support includes a base for being pivotally mounted on the work station and a carriage for being slidably attached to the base. The keyboard is supported on the carriage and the visual readout is supported on the base. The base can then be rotated on the work station station to allow the visual readout to be viewed from any of the several work positions and the keyboard can then be slid out to that work position.

5 Claims, 8 Drawing Figures

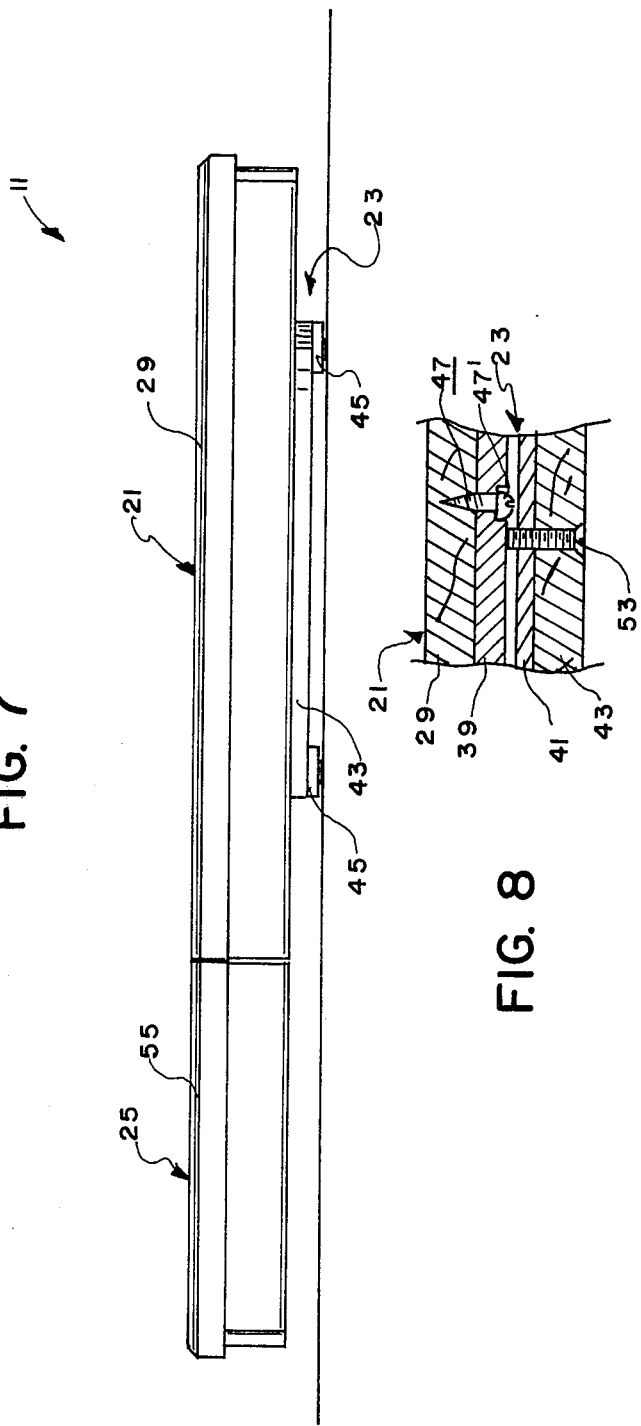

COMPUTER TERMINAL SUPPORT

BACKGROUND OF THE INVENTION

1. Field of the Invention

The present invention relates to support means and more specifically to support means for supporting the keyboard means and the visual readout means of a computer terminal on a work station having several work positions.

2. Description of the Prior Art

Various support means for movably supporting devices on a work station have heretofore been developed. See, for example, Schafer, U.S. Pat. No. 1,798,634; Catron, U.S. Pat. No. 2,452,291; Hampton, U.S. Pat. No. 2,512,933; Copenhaver, U.S. Pat. No. 2,687,267; Abeles, U.S. Pat. No. 2,808,223; McLarney, U.S. Pat. No. 2,950,893; and Popowitz, U.S. Pat. No. 3,067,976. None of the above patents disclose or suggest the present invention.

Computer terminals and the like having visual readout displays for displaying various information and having keyboards for allowing the user thereof to select the specific information to be displayed are becoming widely used in various industries. A common practice is to locate the terminal at a location where several workers can easily use it. A problem occurs when it is desired to centrally locate the terminal in such a manner so as to allow several workers to utilize it while remaining at their specific work stations, desks, etc.

SUMMARY OF THE INVENTION

The present invention is directed towards overcoming problems associated with centrally locating the keyboard means and visual readout means of a computer means on a work station having several work positions in such a manner so as to allow several workers to utilize the keyboard and visual readout means while remaining at their specific work positions at the work station. The concept of the present invention is to rotatably mount the visual readout means at a central position on the work station and to slidably mount the keyboard means with respect to the readout means whereby the readout means can be rotated to face any work position on the work station and the keyboard means can then be slid to that work position.

The support means of the present invention includes, in general, a base means for supporting the visual readout means of a computer means; bearing means for rotatably supporting the base means on a work station and for allowing the base means and, therefore, the visual readout means to be rotated to any of several work positions on the work station, carriage means for supporting the keyboard means of the computer means, and slide means for slidably attaching the carriage means to the base means to allow the carriage means to move between a closed position adjacent the base means and an opened position adjacent any of the several work positions on the work station.

BRIEF DESCRIPTION OF THE DRAWINGS

FIG. 7 is a side elevational view of the support means of the present invention with the carriage means thereof in a closed position.

FIG. 8 is a sectional view substantially as taken on line VIII—VIII of FIG. 6.

DESCRIPTION OF THE PREFERRED EMBODIMENT

Figure 1:
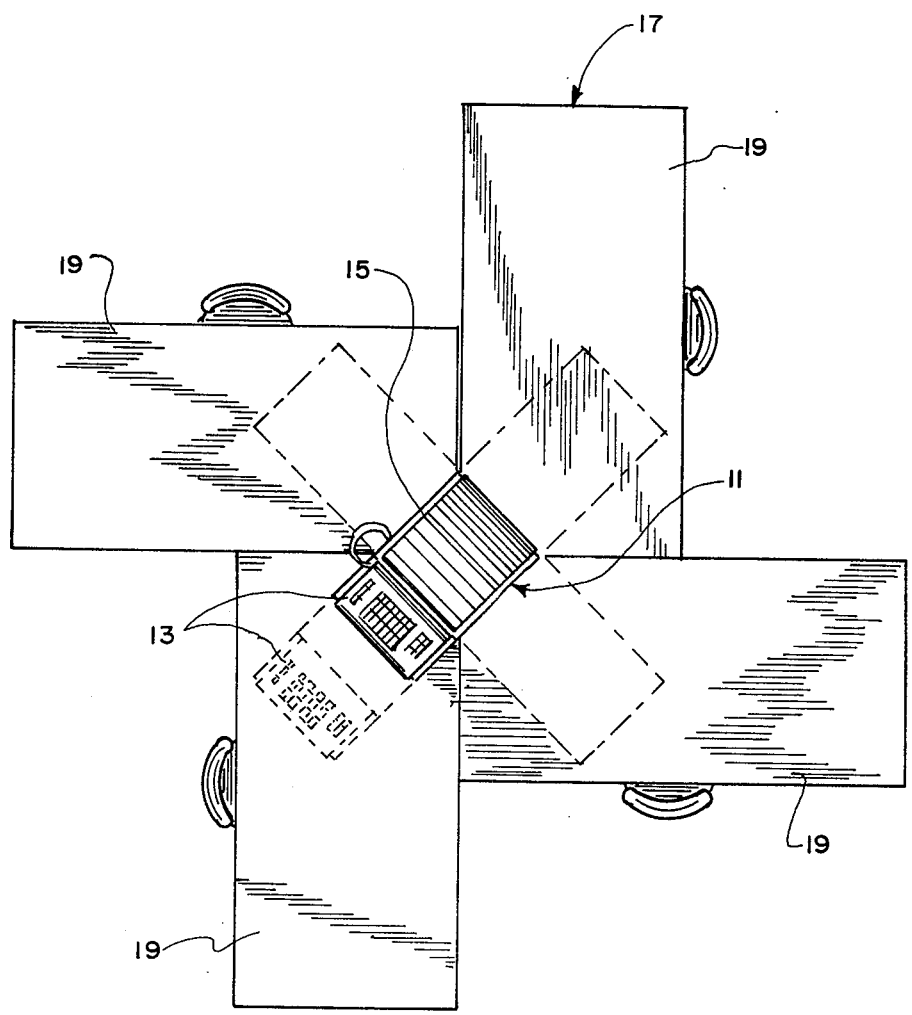
FIG. 1 is a somewhat diagrammatic top plan view of the support means of the present invention shown mounted on a work station and supporting the keyboard means and visual readout means of a computer.

The support means 11 of the present invention is for use in supporting the keyboard means 13 and the visual readout means 15 of a computer means on a work station 17 having several work positions thereon (see, in general, FIG. 1). The work station 17 may consist of four standard desks 19 arranged in a fanlike manner as clearly shown in FIG. 1 with the support means 11 being rotatably supported substantially at the point where all four desks 19 met one another. The support means 11 includes, in general, a base means 21 for supporting the visual readout means 15, bearing means 23 for rotatably supporting the base means 21 on the work station 17, carriage means 25 for supporting the keyboard means 13, and slide means 27 for slidably attaching the carriage means 25 to the base means 21.

The base means 21 may consist of, in general, a substantially flat plate member 29. The plate member 29 preferably has a transverse, substantially vertical aperture 31 extending completely therethrough substantially at the center thereof as clearly shown in FIGS. 2, 3 and 6 for allowing various wires 33 of the visual readout means 15 such as an electric power line, coaxial cable and the like to extend therethrough when the visual readout means 15 is supported on the base means 21. The plate member 29 may also have a plurality of indentations or apertures 31 in the upper surface 29' thereof located so as to receive the standard feet members 37 of the visual readout means 15 as clearly shown in FIGS. 2, 3, and 6 whereby the visual readout means 15 can be nonslidably supported on the plate member 29 of the base means 21 as will now be apparent to those skilled in the art.

Figure 6:
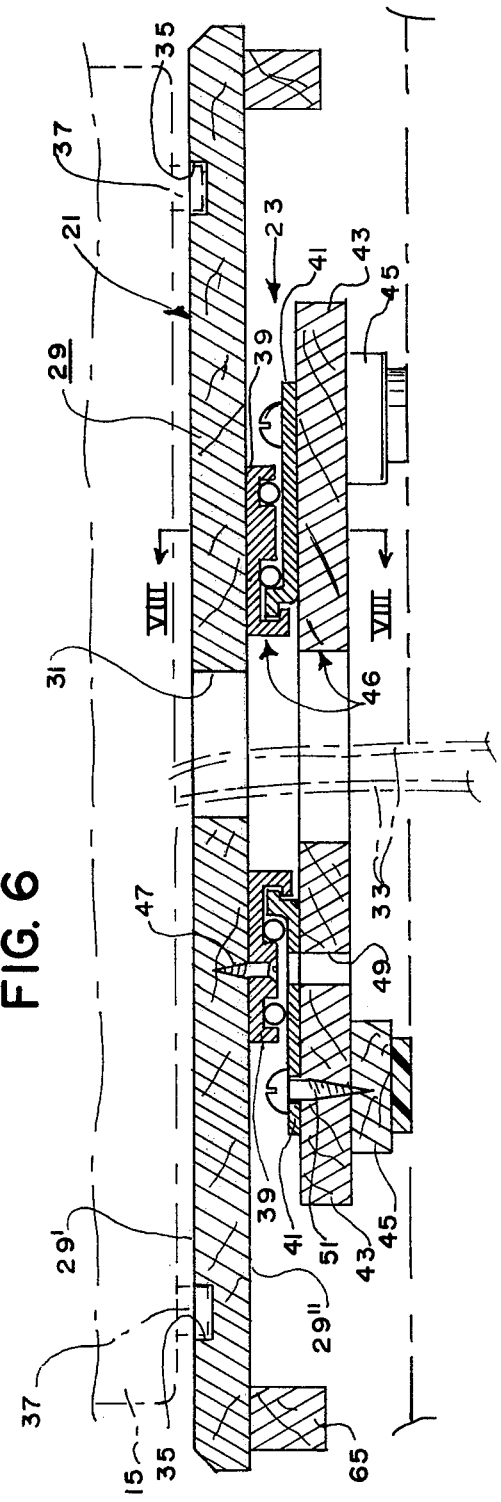
FIG. 6 is a sectional view substantially as taken on line VI—VI of FIG. 3.

The bearing means 23 preferably includes a first bearing member 39 for being fixedly attached to the bottom surface 29" of the plate member 29 of the base means 21 and preferably includes a second bearing member 41 for being rotatably attached to the first bearing member 39 and for resting upon the work station 17 (see FIG. 6). The first and second bearing members 39, 41 may be rotatably attached to one another in any manner apparent to those skilled in the art. Preferably, the first and second bearing members 39, 41 may consist of a typical "lazy susan" bearing means well known to those skilled in the art. The second bearing member 41 may be attached to a platform 43 having a plurality of feet members 45 for resting on the work station 17. The bearing means 23 preferably has an aperture 46 completely through the center of the bearing members 39, 41 and the platform 43 for allowing the wires 33 to extend therethrough as clearly shown in FIG. 6. More specifically, the bearing means 23 is attached to the base means 21 with the aperture 46 through the bearing means 23 substantially aligned with the aperture 31 through the plate member 29 of the base means 21. The first bearing member 39 may be attached to the lower surface 29'' of the plate member 29 in any manner apparent to those skilled in the art such as by way of screws 47 (see FIG. 6). It should be noted that the second bearing member 41 and the platform 43 may be provided with apertures 49 for allowing access to the screws 47 in a manner as will now be apparent to those skilled in the art (see FIG. 6). The second bearing member 41 may be attached to the platform 43 in any manner apparent to those skilled in the art such as by way of screws 51 (see FIG. 6).

The bearing means 23 is preferably adapted to prevent the base means 21 from rotating more than 360° in any one direction. For example, a screw 51 may extend through the platform 43 and through a portion of the second bearing member 41 in such a location so as to make contact with a head 47' of one of the screws 47 which has been modified (e.g., enlarged) so as to come in contact with the screw 51 in a manner as will now be apparent to those skilled in the art to thereby limit rotation of the base means 21 to approximately 355° (see, in general, FIG. 8).

Figure 5:
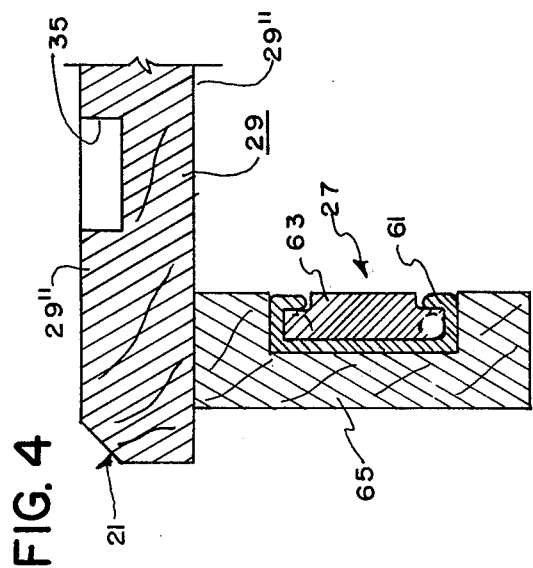
FIG. 5 is a sectional view substantially as taken on line V—V of FIG. 2.

The carriage means 25 preferably includes a substantially flat plate member 55 on which the keyboard means 13 rests. The plate member 55 preferably has a plurality of indentations or apertures 57 in the upper surface 55' thereof for receiving the standard downwardly extending feet members 59 of the keyboard means 13 to prevent the keyboard means 55 from sliding on the plate member 55 (see FIGS. 2, 3 and 5).

Figure 4:
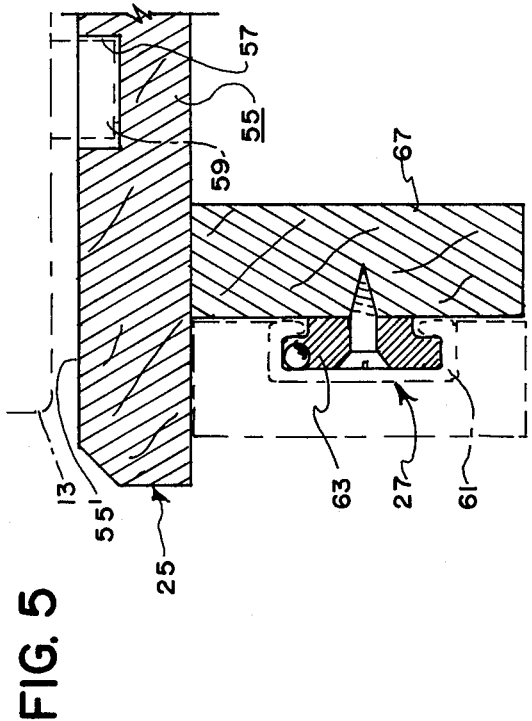
FIG. 4 is a sectional view substantially as taken on line IV—IV of FIG. 2.

The slide means 27 preferably includes a first slide member 61 for being fixedly attached to the plate member 29 of the base means 21 and preferably includes a second slide member 63 for being fixedly attached to the plate member 55 of the carriage means 25 and for being slidably attached to the first slide member 51. The first and second slide members 61, 63 may be constructed in any manner apparent to those skilled in the art. For example, the first and second slide members 61, 63 may consist simply of any typical ball bearing slide means well known to those skilled in the art. The first slide member 61 may be fixedly attached to the plate member 29 of the base means 21 in any manner apparent to those skilled in the art. For example, the first slide member 61 may be fixedly attached to a side frame member 65 by way of screws or the like and the side frame member 65 may be, in turn, fixedly attached to the plate member 29 by way of screws or the like (see, in general, FIG. 4). Likewise, the second slide member 63 may be fixedly attached to the plate member 65 of the carriage means 25 in any manner apparent to those skilled in the art such as by being fixedly attached to a side frame member 67 by way of screws or the like with the side frame member 67 being, in turn, fixedly attached to the plate member 55 by way of screws or the like (see, in general, FIG. 5).

Figure 2:
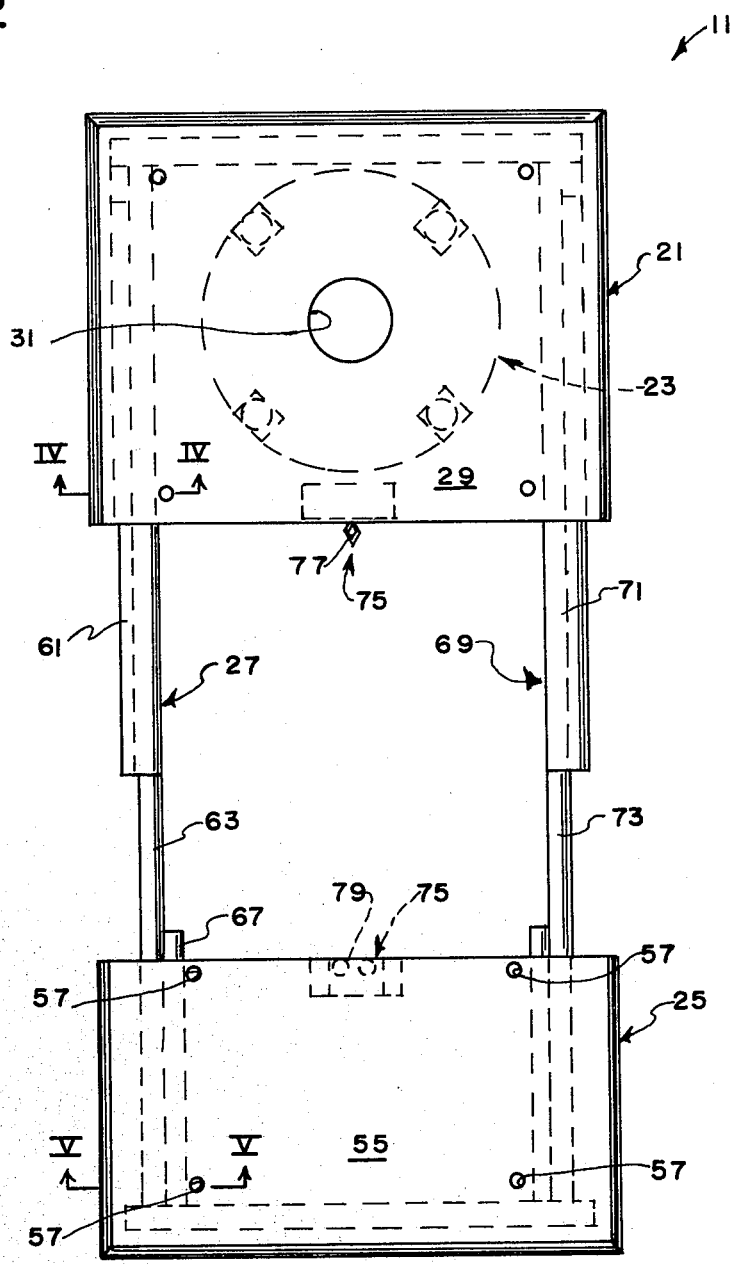
FIG. 2 is a top plan view of the support means of the present invention with the carriage means in an opened position.
Figure 3:
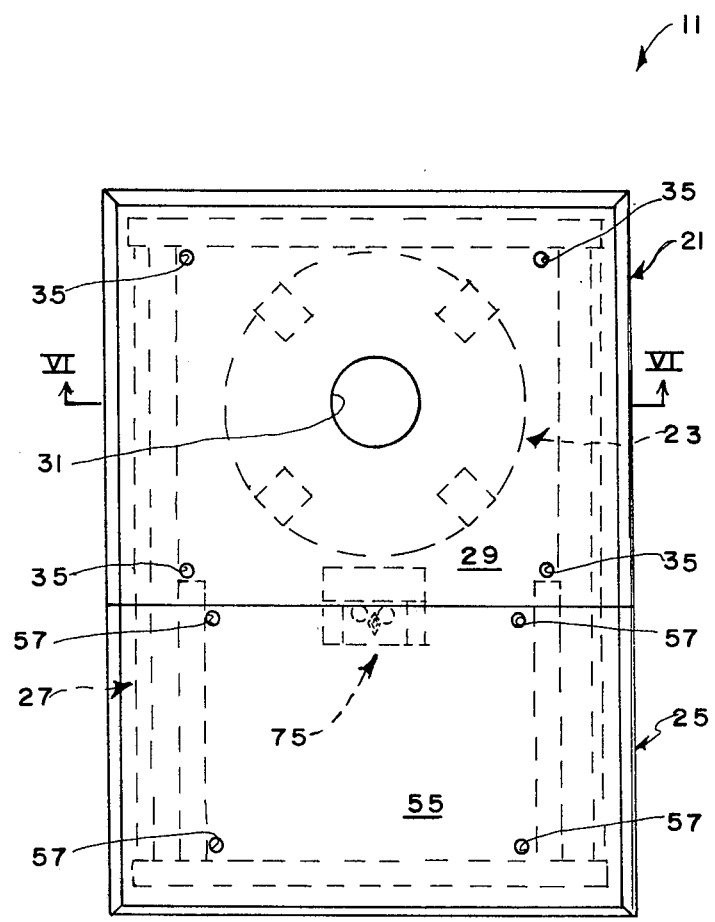
FIG. 3 is a top plan view of the support means of the present invention with the carriage means in a closed position.

The support means 11 preferably includes a second slide means 69 for aiding the slide means 27 in slidably attaching the carriage means 25 to the base means 21 (see, in general, FIG. 2). The second slide means 69 is preferably substantially identical to the slide means 27 and includes a first slide member 71 and a second slide member 73 fixedly attached to the plate members 29, 55 respectively in the same manner as heretofore described relative to the first and second slide members 61, 63 of the slide means 27. The slide means 27, 69 are preferably positioned on the base means 21 and carriage means 25 in a spaced apart position as clearly shown in FIG. 2 to thereby rigidly attach the carriage means 25 to the base means 21.

The preferred manner of utilizing the support means 11 is in conjunction with a work station 17 consisting of four desks 19 arranged in the fanlike manner shown in FIG. 1. The base means 21 and bearing means 23 are preferably positioned so that the apertures 31, 46 therethrough are positioned substantially over the point where all four desks 19 come together to allow the wires 33 to extend therethrough. With the keyboard means 13 supported on the plate member 55 of the carriage means 25 and with the visual readout means 15 supported on the plate member 29 of the base means 21, the base means 21 and carriage means 25 can be rotated on the bearing means 23 to cause the visual readout means 15 to face any work position of any desk 19 as clearly shown in FIG. 1. Once the visual readout means 15 is thus rotated to face a specific work position, the carriage means 25 can be slid outwardly to an open position away from the base means 21 whereby the keyboard means 13 will be positioned substantially at the specific work position. It should be noted that the support means 11 may include a lock means 75 for selectively locking the carriage means 25 in a closed position adjacent the base means 21 (see, in general, FIGS. 2 and 3). The lock means 75 may consist simply of a typical cabinet door latch of any specific construction well known to those skilled in the art that includes, for example, a first member 77 for being fixedly attached to the plate member 29 of the base means 21 and a second member 79 for being fixedly attached to the plate member 55 of the carriage means 25 in a position for coacting with the first member 77 when the carriage means 25 is in the closed position to hold the carriage means 25 in the closed position until manual force is applied thereto to move it to the open position.

Although the invention has been described and illustrated with respect to a preferred embodiment thereof, it is not to be so limited since changes and modifications may be made therein which are within the full intended scope of the invention.

I claim:

1. Support means for supporting the keyboard means and visual readout means of a computer means or the like on a work station having several work positions, said support means comprising:

(a) base means for supporting the visual readout means;

(b) bearing means for rotatably supporting said base means on the work station and for allowing said base means to be rotated to any of the several work positions, said bearing means including a first bearing member for being fixedly attached to said base means and including a second bearing member for being rotatably attached to said first bearing member and for resting on the work station;

(c) carriage means for supporting the keyboard means; and (d) slide means for slidably attaching said carriage means to said base means to allow said carriage means to move between a closed position adjacent said base means and an opened position away from said base and adjacent any of the several work positions.

2. The support means of claim 1 in which said slide means includes a first slide member for being fixedly attached to said base means and includes a second slide member for being fixedly attached to said carriage means and for being slidably attached to said first slide member.

3. The support means of claim 2 in which is included lock means for selectively locking said carriage means in said closed position.

4. The support means of claim 3 in which said base means and said bearing means having substantially aligned apertures through substantially the centers thereof for allowing electrical cords and the like of the computer means to pass therethrough.

5. The support means of claim 4 in which said bearing means includes a plurality of foot members attached to said second bearing member for resting on the work station.

* * * * *